US006246046B1

United States Patent
Landers et al.

(10) Patent No.: US 6,246,046 B1
(45) Date of Patent: Jun. 12, 2001

(54) METHOD AND APPARATUS FOR ELECTRONICALLY CONTROLLED SCANNING OF MICRO-AREA DEVICES

(75) Inventors: James P. Landers; Zhili Huang; Andreas Huhmer, all of Pittsburgh, PA (US)

(73) Assignee: University of Pittsburgh, Pittsburgh, PA (US)

( * ) Notice: Subject to any disclaimer, the term of this patent is extended or adjusted under 35 U.S.C. 154(b) by 0 days.

(21) Appl. No.: 09/234,549

(22) Filed: Jan. 21, 1999

(51) Int. Cl.$^7$ ........................................ H01J 3/14
(52) U.S. Cl. ........................................ 250/216; 250/235
(58) Field of Search ........................ 250/216, 234, 250/235, 458.1, 459.1, 461.2

(56) References Cited

U.S. PATENT DOCUMENTS

| | | | |
|---|---|---|---|
| 4,368,489 | 1/1983 | Stemme et al. | |
| 4,800,270 | 1/1989 | Blais | 250/235 |
| 4,800,271 | 1/1989 | Blais | 250/235 |
| 4,827,125 | 5/1989 | Goldstein | 250/234 |
| 4,877,966 | * 10/1989 | Tomei et al. | 250/458.1 |
| 4,893,008 | * 1/1990 | Horikawa | 250/234 |
| 5,006,210 | 4/1991 | Yeung | 204/452 |
| 5,039,855 | 8/1991 | Kemeny | 250/339 |
| 5,274,240 | 12/1993 | Mathias | 250/458.1 |
| 5,317,446 | 5/1994 | Mir et al. | 359/296 |
| 5,324,401 | 6/1994 | Yeung . | |
| 5,436,130 | 7/1995 | Mathias | 435/6 |
| 5,459,325 | 10/1995 | Hueton et al. | 250/458.1 |
| 5,545,901 | 8/1996 | Pentany, Jr. | 250/458.1 |
| 5,615,675 | 4/1997 | O'Donnell | 128/653.1 |
| 5,633,747 | 5/1997 | Nikoonalad | 359/312 |
| 5,677,970 | 10/1997 | Nashimato | 385/7 |
| 5,695,626 | 12/1997 | Yeung | 204/605 |
| 5,741,411 | 4/1998 | Yeung | 204/452 |
| 5,754,291 | 5/1998 | Kain | 356/338 |
| 5,763,162 | 6/1998 | Glazer | 435/6 |
| 5,790,167 | 8/1998 | Nashimoto | 347/259 |
| 5,847,805 | 12/1998 | Kohayakawa | 351/210 |

FOREIGN PATENT DOCUMENTS 0 459 214 A1   12/1991   (EP) .
0 627 643 A2   12/1994   (EP) .

OTHER PUBLICATIONS

Harrison, D.J., Fluri, K., Seiler, K., Fan, Z., Effenhauser, C.S., Manz, A., "Micromachining a Minaturized Capillary Electrophoresis–Based Chemical Analysis System on a Chip," Science, vol. 261, p. 895–897, (Aug. 13, 1993).

Rossomando, E.F., White, L., Ulfelder, K.J., "Capillary electrophoresis: separation and quantitation of reverse transcriptase polymerase chain reaction products from polio virus," Journal of Chromatography B: Biomedical Applications, Elsevier Science B.V., vol. 656, p. 159–168, (1994). Month unknown.

(List continued on next page.)

Primary Examiner—Que T. Le
(74) Attorney, Agent, or Firm—Thorp Reed & Armstrong

(57) ABSTRACT

The present invention provides an excitation source which may be used, for example, in conjunction with the scanning of multi-channel electrophoresis chips or capillary arrays. The excitation source is comprised of a source of light, such as a laser beam. A beam expander, an acousto-optic deflector, and a filter are optically aligned with the source of light. A driver is connected to the acousto-optic deflector for controlling the angle of deflection. A system is disclosed which includes the excitation source, a detector for detecting fluorescence from a target chip, and a beam splitter or other device for optically connecting the excitation source to the chip and for optically connecting the chip to the detector. The excitation source may be based on an acousto-optic deflector, an electrooptic deflector, a piezoelectric deflector, or any other electronically controlled device. Methods of focusing a beam of collimated light and electronically exciting a plurality of micro-areas of a target chip, either serially or in parallel, are also disclosed.

54 Claims, 8 Drawing Sheets

OTHER PUBLICATIONS

Ueno, K., and Yeung, E. S., "Simultaneous Monitoring of DNA Fragments Separated by Electrophoresis in a Multiplexed Array of 100 Capillaries," Analytical Chemistry, American Chemical Society, vol. 66 (No. 9), p. 1424–1431, (May 1, 1994).

Huang, X.C., Quesada, M.A. and Mathies, R.A., "Capillary Array Electrophoresis Using Laser–Excited Confocal Fluorescence Detection," Analytical Chemistry, American Chemical Society, vol. 64 (No. 8), p. 967–972, (Apr. 15, 1992).

Gass, P.A., Schalk, S., and Sambles, J.R., "Highly sensitive optical measurement techniques based on acousto–optic devices," Applied Optics, Optical Society of America, vol. 33 (No. 31), p. 7501–7509, (Nov. 1, 1994).

Hruban, R.H., Yeo, C.J., Kern, S.E., "Pancreatic Cancer" edited by B. Vogelstein and K.W. Kinzler, New York, McGraw–Hill, (Feb. 9, 1998).

Oda, R.P., Wick, M.J., Rueckert, L., Lust, J.A., Landers, J.P., "Evaluation of capillary electrophoresis in polymer solutions with laser–induced fluorescence detection for the automated detection of T–cell gene rearrangements in lymphoproliferative disorders," Electrophoresis, vol. 17, p. 1491–1498, (1996). Month unknown.

Woolley, Adam T., et al., "High–Speed DNA Genotyping Using Microfabricated Capillary Array Electrophosis Chips," Analytical Chemistry, vol. 69 (No. 11), (Jun. 1, 1997).

Ian, Hong Dong, "Automation and Integration of Multi–Plexed On–Line Sample Preparation with Capillary Electrophoresis for High–Through Put DNA Sequencing," Analytical Chemistry, vol. 70 (No. 19), (Oct. 1, 1998).

Landers, J.P., "Handbook of Capillary Electrophoresis," CRC Press, p. 1–9, (Feb. 9, 1997).

Takahashi, S., et al., "Multiple Sheath–Flow Gel Capillary–Array Electrophoresis for Multicolor Fluorescent DNA Detection," Analytical Chemistry, p. 1021–1026, (Feb. 9, 1994).

Marshall, G., "Optical Scanning," Marcel Dekker, Inc., (Feb. 9, 1991), pp 615–625.

Xu, J.P. and Stroud, R., "Acousto–Optic Devices," Principles, Design and Applications, John Wiley & Sons, Inc., (Feb. 9, 1992).

Trepte O. and Lijeborg, A., "Computer Control for a Galvanometer Scanner in a Confocal Scanning Laser Microscope," Optical Engineering, p. 3774–3780, (Feb. 9, 1994).

Bullen, A., et al., "High–Speed, Random–Access Fluorescence Microscopy: I. High–Resolution Optical Recording with Voltage–Sensitive Dyes and Ion Indicatios," Biophysical Journal, p. 477–491, (Feb. 9, 1997).

* cited by examiner

FRAME 1

FRAME 2

FRAME 3

FRAME 4

FRAME 5

FRAME 6

METHOD AND APPARATUS FOR ELECTRONICALLY CONTROLLED SCANNING OF MICRO-AREA DEVICES

BACKGROUND OF THE INVENTION

1. Field of the Invention

The present invention is directed generally to non-mechanical scanning techniques and, more specifically, to electronically controlled scanning of micro-area devices such as multi-channel electrophoresis chips, capillary arrays, microtiter plates, matrix hybridization array chips, etc.

2. Description of the Background

Cancer detection and screening utilizing genomic markers has proven very successful for a variety of cancers. These assays typically include amplification of a target sequence followed by separation of the products. Capillary electrophoresis has proven its ability to decrease the separation time requirements over traditional slab gels while maintaining resolution of the DNA fragments for diagnosis. Electrophoretic chips have reduced this separation time requirement even further.

Laser-induced fluorescence detection is a fundamental aspect of the burgeoning chip technology being developed for these and other purposes, and has led to the need for the development of innovative approaches for rapid, sensitive and flexible laser scanning of micro-area devices (i.e. devices having micro-targets) which include such devices as capillary arrays, electrophoresis chips having capillary arrays or point targets, microtiter plates having an array of wells and or point targets, matrix hybridization array chips having a plurality of point targets, and the like.

Capillary electrophoresis (CE) has been demonstrated as a powerful technology for the analysis of DNA, proteins and a variety of small molecules due to its inherent advantages including small sample requirement, high separation speed, and cost-effectiveness. Electrophoretic separations in capillaries have been extrapolated to microfabricated chips where capillary-like channels are etched in the surface of planar sustrates. This development has provided a platform where arrays of microchannels not only compete effectively with slab gels for the parallel processing of multiple samples, but reduce total analysis times by as much as two orders of magnitude. The detection of resolved analyte zones in microchannel electrophoresis is commonly accomplished using laser-induced fluorescence (LIF) detection as a result of its technical simplicity as well as the attomole sensitivity attainable. This is particularly the case with the detection of double stranded DNA which is accomplished via the use of double stranded intercalators, but also with single stranded DNA through covalently-bound fluors. In fact, using a sheath flow cell and a microscope, single molecule detection in a capillary has been demonstrated. The extension of single channel fluorescence detection to multiple channels is analogous to the extension of single detector or array detector or a scanning mode.

One of the most powerful multi-channel detectors available for low-intensity level fluorescence array detection is the charge coupled device or CCD camera. There have been several reports of using CCD cameras for LIF detection in CE. In this particular application, a CCD camera is used to acquire a series of pictures of the fluorescence emission from a point(s) on the capillary as a function of time. Serial analysis of the pictures acquired by the CCD camera allows for molecule movement to be monitored and quantitated. Yeung et al. described a one-color LIF detection system for 96 channel electrophoresis using a CCD camera. "Automation and Integration of Multiplexed On-Line Sample Preparation with Capillary Electrophoresis for High-Throughput DNA Sequencing." Anal. Chem., 1998, 70, 4044–4053. The most significant advantage associated with detection using a CCD camera is that an increase in the observation zone does not correspond to a decrease in temporal resolution. However, the number of the capillaries or microchannels on a chip is limited by the resolution and sensitivity of the CCD camera. Because the CCD acquires the image through a large amount of stored data, the image processing time for real-time analysis is another obstacle, limiting the number of microchannels that can be effectively utilized on the microchip. Another obvious drawback is the full-field illumination. Because the CCD camera acquires information from all channels simultaneously, full field illumination is required, but this is associated with some disadvantages. First, a long illumination time will increase photodynamic damage and dye bleaching. Second, with all of the channels excited at the same time, scattering from neighboring channels will effect the detected channel. That is, the channel cross-talk will increase. This second disadvantage will eventually restrict the channel number on a given chip.

Another approach for realizing multi-channel detection is to translate the stage on which the chip is mounted. The stage scanning approach has been demonstrated by Mathies and coworkers using a planar array of capillaries [capillary array electrophoresis (CAE)] mounted on a computer-controlled precision translation stage. Huang et al., "Capillary Array Electrophoresis Using Laser-Excited Confocal Flourescence Detection", Anal. Chem. 1992, 64, 967–972; Woolley et al., "High-Speed DNA Genotying Using Microfabricated Capillary Array Electrophoresis Chips", Anal. Chem. 1997, 69, 2181–2186. A laser beam was focused onto the chip by a microscope objective and a portion of the emitted fluorescence was collected by the same objective, followed by confocal detection using a photomultiplier tube (PMT). During electrophoresis, the stage was translated, effectively sweeping the chip back and forth periodically. There is no limitation to the number of the capillaries or multi-channels, but as a result of the mechanical movement with this method, it is difficult to realize ultra-fast scanning rates over wide scanning regions or to scan different regions at the same time, limiting the separation time and real-time processing for electrophoresis.

An alternative approach for realizing multichannel CAE detection is laser beam scanning. There are a number of methods for laser scanning. See Marshall, "Optical Scanning", Marcel Dekker, Inc., 1991; Trepte et al., "Computer Control for a Galvanometer Scanner in Confocal Scanning Laser Microscope." Optical Eng. 1994, 33, 3774–3780. Most of the commercially-available scanning microscopes are based on mechanically movable mirrors positioned by motors. The obvious advantage associated with reflection scanning is that it is wavelength-independent. However, due to its mechanically-controlled nature, it is difficult to achieve ultrahigh scanning rates and cancel out the mechanical noise, e.g., wobble. This can result in the distortion in a scanned image or signal and, with capillaries or multi-channels, can be associated with defocusing of the laser beam during detection. Mathies group has recently presented a circular 96-channel silica chip with LIF detection achieved via a spinning objective system exploiting a similar galvanometeric approach to that described previously. Frederick Conference on Capillary Electrophoresis, 1998, Frederick, Md.

Electro-optical scanning is based on the fact that the optical properties of certain materials have an electric field dependence (E-O effect). An advantage of the electro-optical scanner is that, with most applications, it can be treated as a capacitor with the speed of operation dependent on the output characteristics of the drive circuit. Consequently, nanosecond sweep rates can be obtained. Unfortunately, as yet, few materials have been discovered that exhibit a strong enough E-O effect to make them useful as practicable E-O devices. In addition, the commercially-available devices are physically too large to be applied to microscopy.

Acousto-optic devices appear to be a relatively unexplored approach to laser beam scanning for excitation of fluorescence targets on micro-area devices. AOD's utilize the diffraction effect induced by optical gratings to achieve laser beam deflection. The acousto-optic (A-O) effect occurs when a light beam passes through a transparent material in which acoustic waves are also present, as depicted in FIG. 1. Acoustic waves are generated by a piezoelectric transducer that is driven by a RF signal. The spatially periodic density variations in the material corresponding to compressions and rarefaction of the travelling acoustic wave are accompanied by corresponding changes in the index of rarefaction for propagation of light in the medium. For acoustic waves of sufficiently high power, most of the light incident on the acousto-optic device will be diffracted and, therefore, deflected from its incident direction. Rapid manipulation of the acoustic frequency allows for these devices to be used as very fast one-dimensional deflectors, providing rapid one-dimensional random-access laser beam scanning.

In an acousto-optic deflector, the applied power is held constant and the frequency is varied over the range of frequency $\Delta f$ centered at $f_0$. FIG. 1 shows the input and output angles relative to the direction of acoustic power propagation. The size of the deflector angle and, hence, the area that can be scanned by acousto-optic device is defined by:

$$\Delta \Theta = \frac{\lambda \Delta f}{V}$$

Where V is the acoustic velocity within the optical medium, $\lambda$ is the laser wavelength within the medium, and $\Delta f$ is the bandwidth of the acoustic frequency. Because the deflection angle is proportional to the acoustic frequency and inversely proportional to the acoustic velocity, generation of relatively large scan angles requires that deflectors operate with a large acoustic frequency bandwidth and/or a low acoustic velocity.

For any of these approaches to be exploited for CE and, in particular, with multi-channel electrophoretic microchips, several factors should be considered: spatial resolution, sensitivity and temporal resolution. Scatter, cross-talk, ease of us and cost are additional factors that need to be addressed for micro-area devices.

SUMMARY OF THE INVENTION

One aspect of the present invention is to provide an excitation source which may be used, for example, in conjunction with the scanning of micro-area devices. The excitation source is comprised of a source of light, such as a laser beam. A beam expander, an acousto-optic deflector, and a filter are optically aligned with the source of light. A driver is connected to the acousto-optic deflector for controlling the angle of deflection. The excitation source of the present invention may be used in conjunction with a variety of micro-area device targets such as electrophoresis chips carrying a plurality of channels, a capillary array, electrophoresis chips having multiple domains, micro titer plates, matrix hybridization array chips, etc.

The present invention is also directed to a method for electrically controlling the excitation of a plurality of domains of a target. A detector for detecting fluorescence from the target is provided as is a beam splitter or other device for optically connecting the excitation source to the target and for optically connecting the target to the detector. The excitation source may be based on an acousto-optic deflector, an electrooptic deflector, a piezoelectric deflector, or any other electronically controlled device. In a preferred embodiment, the detector includes a photomultiplier tube.

The present invention is also directed to a method of focusing a beam of collimated light to a desired diameter, deflecting the focused light beam with an acousto-optic deflector, and filtering the light output from the acousto-optic deflector.

The method of the present invention also includes electronically scanning a micro-area device target such as a plurality of channels of an electrophoresis chip, electrically scanning a capillary array, and scanning and/or exciting multiple domains on an electrophoresis chip, micro titerplate, matrix hybridization array chips, or other mircoarrays, either serially or in parallel.

The method of the present invention is also directed to the calibration of a control device, and the subsequent controlling of an excitation source, both spatially and temporally.

The present invention provides a simple and extremely rapid scanning apparatus and method with no moving parts. Consequently, up to 200 densely-packed micro-channels or capillaries can be scanned in less than a millisecond, which translates into a scanning frequency of up to several kilohertz. The use of the present invention will allow, for example, for the realization of a flexible, high speed, high resolution micro-channel monitoring system for multifunction capillary electrophoresis on a single chip. Additionally, the laser beam can be addressed, spatially and temporarily to any two dimensional location on the chip, making it applicable to a number of high through put applications. Those advantages and benefits, as well as others, will become apparent from the description of the preferred embodiments herein below.

BRIEF DESCRIPTION OF THE DRAWINGS

For the present invention to be readily practiced and easily understood, the present invention will now be described in conjunction with the following figures wherein.

DESCRIPTION OF PREFERRED EMBODIMENTS

Figure 1:
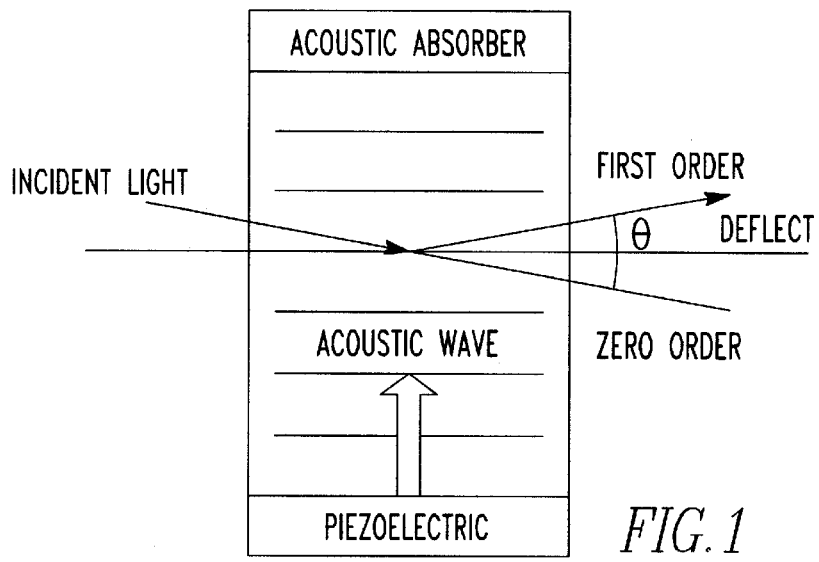
FIG. 1 illustrates the principle of operation of an acousto-optic deflector.
Figure 2:
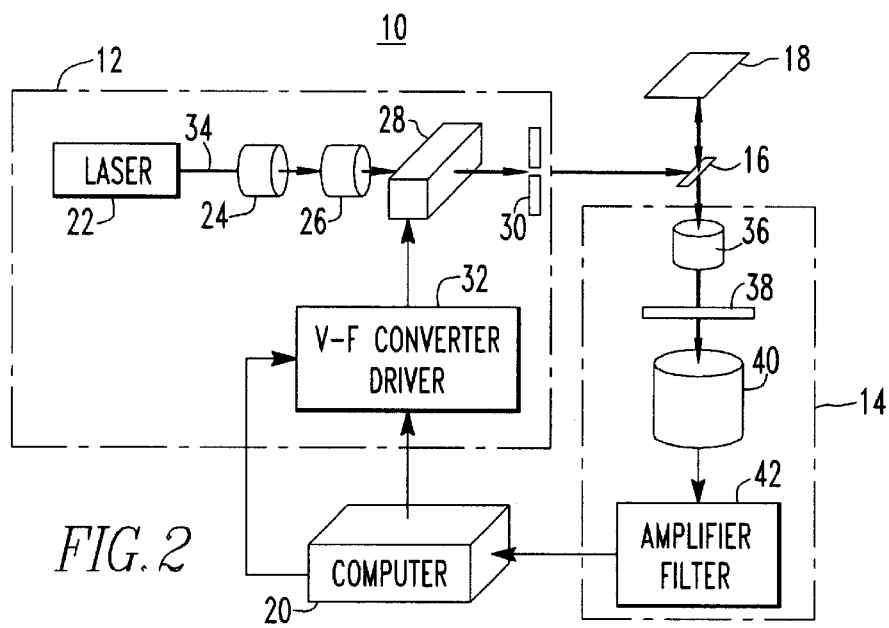
FIG. 2 illustrates a system constructed according to the teachings of the present invention.

FIG. 2 illustrates a system 10 constructed according to the teachings of the present invention. The system 10 is comprised of three major components; an excitation source 12, a detector 14, and a device or means 16 for optically coupling the excitation source 12 and the detector 14 to a target 18. In the embodiment of the system 10 shown in FIG. 2, a dichroic beam splitter is used as the device 16. In that manner, the target may be excited or illuminated, and fluorescence detected, from the same side of the target. The reader will recognize, however, that other types of devices 16, which are well known in the art, may be utilized such that the target is illuminated from one side of the system 10 and fluorescence is detected from another side of the system 10. The target 18 illustrated in FIG. 2 is an electrophoresis chip 18. However, the reader should recognize that other types of targets may be used, particularly capillaries or other devices having microchannels, micro-arrays or other types of micro-targets. A computer 20 may be additionally added to the system 10 for the purpose of gathering raw data from the detector 14 and also for the purpose of inputting control signals to the excitation source 12.

The components comprising the excitation source 12 will now be identified. However, the reader should understand that other components may be used, and more or less components may be necessary, to provide a suitable excitation source 12. As illustrated in FIG. 2, the excitation source 12 is comprised of a laser 22, beam expander 24, lens 26, acousto-optic deflector 28, and a spatial filter 30. The beam expander 24, lens 26, acousto-optic deflector 28, and spatial filter 30 are all optically aligned with the laser 22. That is, the aforementioned devices are aligned on an optical path such that a beam of light 34 produced by the laser 22 is received by each of the aforementioned components, in turn. It should be noted that although a laser source 22 is indicated, other sources of collimated light may be used. Additionally, sources of light that are not collimated may be used provided that they have sufficient intensity at the wavelength(s) of interest. The excitation source 12 also includes a voltage to frequency converter and a driver 32 for the acousto-optic deflector 28. Other types of electrical deflectors may be used in place of the acousto-optic deflector 28. Specifically, electrooptic deflectors and piezoelectric deflectors may also be used. In the event such alternative deflectors are used, the supporting components such as the beam expander 24, lens 26 and spatial filter 30 may need to be changed, or replaced with other devices, or reoriented depending upon the characteristics of the deflector chosen.

The components comprising the detector 14 will now be identified. The reader should recognize, however, that other components may be used depending on the manner in which the detector 14 is optically coupled to the target 18 and the intensity of the fluorescence to be detected. As shown in FIG. 2, the detector 14 is comprised of an objective lens 36, a filter 38, and a photomultiplier tube 40 all aligned along a common optical path. The output of the photomultiplier tube 40 is input to an amplifier/filter 42. The output of the amplifier/filter 42 may be input to the computer 20.

The invention provides advantages over the prior art with respect to spatial resolution, scanning modes and scanning speeds.

The spatial resolution in acousto-optic scanning is defined as the number of independent spots that can be generated across the deflection angle of the deflector 28.

$$N = D\Delta f/\gamma_s$$

Where N is the number resolvable points, $\Delta f$ is the bandwidth of the acoustic frequency, D is the beam diameter or the aperture size of the deflector 28, and $\gamma_s$ is the acoustic velocity. This equation indicates that the resolution can be increased by increasing the acoustic bandwidth, increasing the beam diameter, or decreasing acoustic velocity. Of these parameters, we have control over the beam diameter as a means of increasing the resolution. Thus, the need for the beam expander 24 and lens 26. Obviously, the beam expander 24 and lens 26 would not be necessary if some other method of controlling spatial resolution is employed. Fortunately, currently available deflectors are capable of 2000 spots in several degrees of the deflection angle. Therefore, a very high spatial resolution can be obtained with acousto-optic scanning.

Scanning modes with acousto-optic deflectors can be separated into four broad categories: raster, bidirectional, step, and random addressing, as shown in FIG. 3. In raster scanning, 3A, the laser spot is swept at a constant velocity over a fixed range in a repetitive manner. At the end of each linear sweep, the scanner reverses direction, returns to the starting position and repeats the scan. In some applications, raster scanning can also be performed in alternating directions, that is, a bi-directional mode, as shown in FIG. 3B. Galvanometric, translational stage, and AOD-based scanning can be used to realize these modes of laser beam scanning. In step scanning, FIG. 3C, the laser beam is moved rapidly from one position to another. The path traveled between the two end positions is not important to the application. The translational stage approach cannot be used for this scanning mode. With random addressing of the laser beam, FIG. 3D, the laser beam moves from one position to another rapidly and really without a travelling track, and the dwell time at each position can be controlled. The galvanometer and translation stage cannot be used in this mode. This mode is especially useful for multi-micro-channel scanning in a manner that can eliminate scatter and crosstalk.

The speed of electrophoretic analysis is dependent on the voltage applied to the separation channel and the detection access time. A CCD acquires a series of pictures of the fluorescence emission, then transfers them into a host computer for analysis. There are two limitations for rapid analysis, the image processing time and the exposure time of the camera. As computing speeds increase, the image processing time become less of a problem for real-time analysis. However, the exposure time of the camera is usually several milliseconds. In a recent paper, Tan et al. "Automation and Integration of Multiplexed On-Line sample Preparation with Capillary Electrophoresis for High-Throughput DNA Sequencing", Anal. Chem., 1998, 70, 4044–4053, the exposure time was set at 300 ms, so the frequency of data collection was about 3 Hz. While this may be considered adequate for some applications, it would be impossible to use this CCD-based detection system and realize high-speed analysis (few seconds or sub-second separation) without further reduction of the analysis time.

The translational stage limits scanning rates due to mechanical movement. In the work described by Mathies and coworkers, Woolley et al, supra., the channels on a CAE ship were scanned bidirectionally with periodic 0.3 s sweeps at 1.0 cm/s. The sampling rate of the CAE chip was set to 3.3 Hz. Again, the limitation in analytical separation speed is inherent.

Galvanometers provide an effective solution in many applications that require laser or optical beam scanning. Applications include pointing for alignment and control, image capturing and printing for easy transfer of images to and from different media, non-contact sensing and measurement of a broad range of physical properties, and material processing including marking and other treating tasks. The galvanometric scanner also finds wide applications in the confocal scanning laser microscope. A galvanometer combined with a mirror, a stepping motor, and drive electronics represent the major components of a scan system needed for each axis of beam scanning motion. According to manufacturers, the scanning rate for the galvanometer can reach 2.4 kHz with 2° deflection or reduced scanning rates with larger deflection angles.

The access time for an acousto-optic deflector represents the time required for the acoustic wave to fill the aperture. For most acousto-optic deflectors, the access time is in the microsecond or nanosecond range. The access time for the acousto-optic deflector we used in our preliminary study is 0.18 $\mu$s; for six channel scanning, the maximum scanning can be carried out at 920 kHz. The access time for the acousto-optic deflector with a 2.25° deflection angle from Brimrose Corporation of America (Baltimore, Md.) is 0.7 $\mu$s (GPD-650-300); 128 channel scanning only takes 89.6 $\mu$s, and the scanning rate is 11.16 kHz. Therefore, faster electrophoretic analyses can be performed in a multichannel format without compromising the quality of the data collection.

As will be discussed in the "Experimental Results" section below, using a relatively inexpensive acousto-optic deflector capable of a limited deflection angle of only 0.28°, we have successfully achieved rapid scanning over six microchannels spaced 100 $\mu$m center-to-center. The fact that acousto-optic deflectors with deflection angles in the 1–5° range are commercially available makes clear the potential for rapid scanning of densely-packed capillaries, microchannels on a chip or micro-arrays. In fact, an acousto-optic deflector capable of 20° deflection angle is available, although costly in nature. With such a scanning range, it will be possible to realize 700 microchannel scanning with one acousto-optic deflector, so that the throughput for electrophoretic analysis either with CAE or in microchip format can be increased.

Without any moving parts, an acousto-optic deflector based scanner provides improved stability and reliability over comparable scanning systems, which involve either mechanical translation of the chip or manipulation of the laser beam via a motorized mirror, such as a galvanometer. Currently, based on manufacturer information, the performance benefits of an acousto-optic deflector are high-efficiency, wide bandwidth, operation up to several gigahertz, very large figure of merit (low drive power requirements) and low acoustic losses. This combination of properties not only makes acousto-optics the method of choice for many designs, but often the only approach to satisfy demanding requirements.

As can be seen from the following preliminary studies, we can demonstrate acousto-optic laser beam scanning on a multichannel chip, searching for channel positions, and then addressing the laser beam to each channel directly. This "self-aligning" technique makes the present invention very flexible with respect to chip-based and capillary-based applications.

Experimental Results

Figure 4:
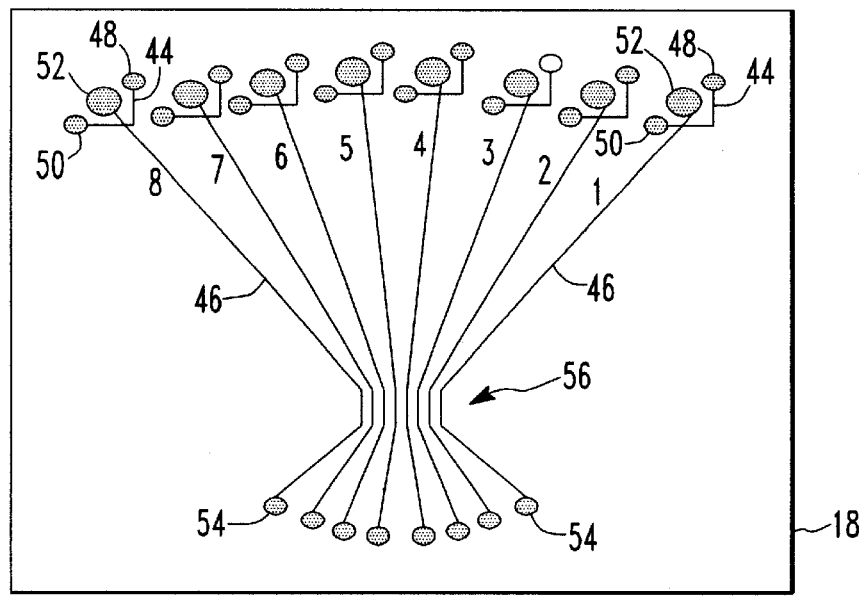
FIG. 4 illustrates an 8-channel microchip sample target.

The system 10 illustrated in FIG. 2 has been built and tested. The target 18 we used was an 8-channel microchip shown in FIG. 4.

Eight independent pairs of injection channels 44 and separation channels 46 were patterned on a 100 mm×100 mm microchip 18. All channels were etched to a depth of 20 $\mu$m, with 50 $\mu$m width. The 10 mm long injection channels 44 connect reservoirs 48 and 50, and 65 mm long separation channels 46 connect reservoirs 52 and 54. The detection is carried out in the middle region 56, where the eight channels 46 converge with a center-to-center space of 100 $\mu$m in a focal area of 1.2 mm. Consequently, the scanning area is about 1.0 mm at the detection region 56. Because of the blockage in two of the channels the following results are described for six channels. (We had two eight channel chips 18. There were two channels blocked on both of them. One blocked in channel 3 and 5, which was used in the scanning range study. Another blocked in channel 7 and 8, which was used in the detection scanning).

A continuous-wave argon ion laser (532R-BS-A04, Melles Griot, Carlsbad, Calif.) was utilized as the laser 22. The output wavelength was 488 nm and the power 25 mW. A 4x beam expander (Spindler & Hoyer,) was used as the beam expander 24 to expand the laser beam diameter from 0.6 mm to 2.4 mm to decrease the laser spot size on the chip.

The lens 26 was a precision optimized achromats lens (Melles Griot, Carlsbad, Calif.). The acousto-optic deflector 28 was an ISOMET 1205C and the driver 32 was an ISOMET D320 (Isomet Corporation, Springfield, Va.). The lens 26 was used for laser beam focusing with a working distance at 250 mm. With this configuration, the maximum scanning area is approximately 1 mm with a spot size of roughly 50 $\mu$m. The driver 32 was an electronically-tunable, on-off gated RF generator with a class-A power amplifier. The RF generator was a voltage-controlling oscillator (V-F converter), whose frequency was linear to the input voltage. A computer-controlled digital-to-analog converter (DAC) (DT302, Data Translation) output the voltage to the V-F converter/driver 32 to control the position of the laser spot on the microchip 18. The spatial filter 30 passes the first order diffraction laser beam and obstructs the zero-order, second- and higher-order diffraction to reduce extraneous scattered light on the microchip 18.

Figure 5A:
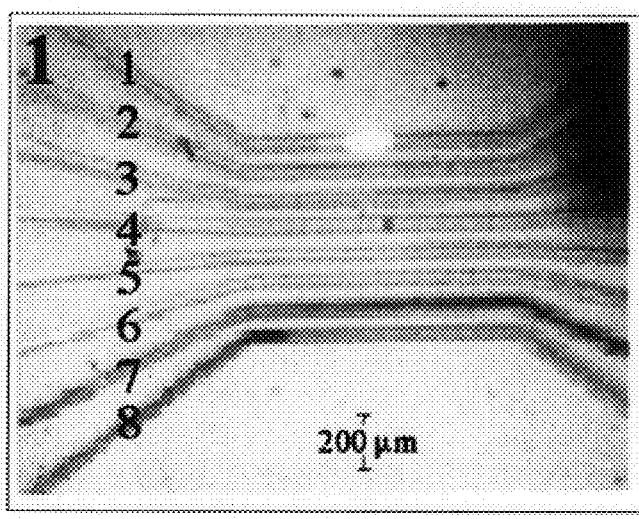
FIGS. 5A–5F illustrate scan results obtained with the system of FIG. 2.
Figure 5B:
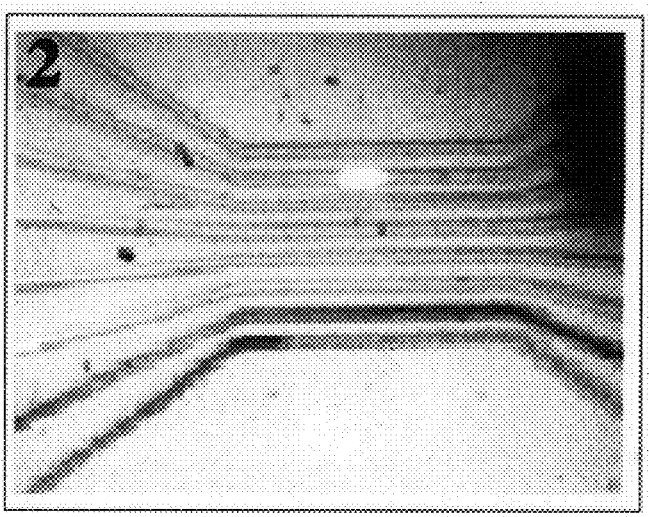
Figure 5C:
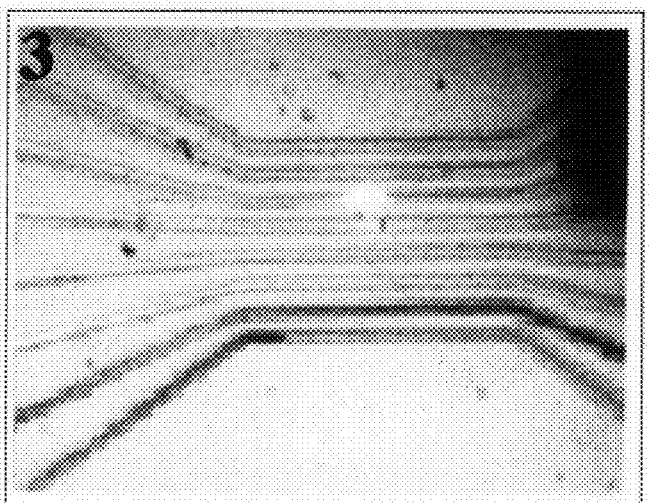
Figure 5D:
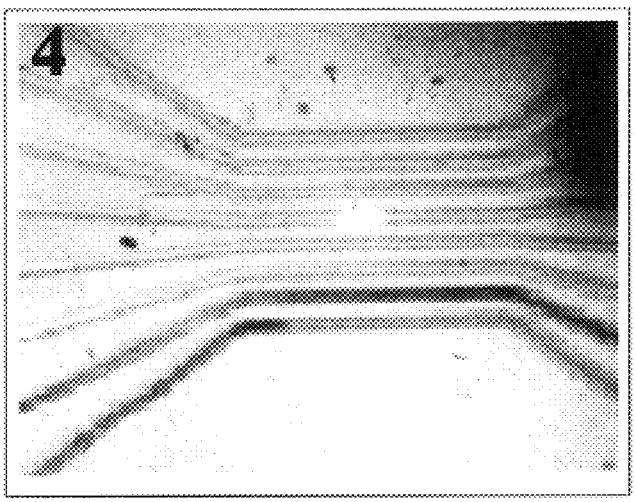
Figure 5E:
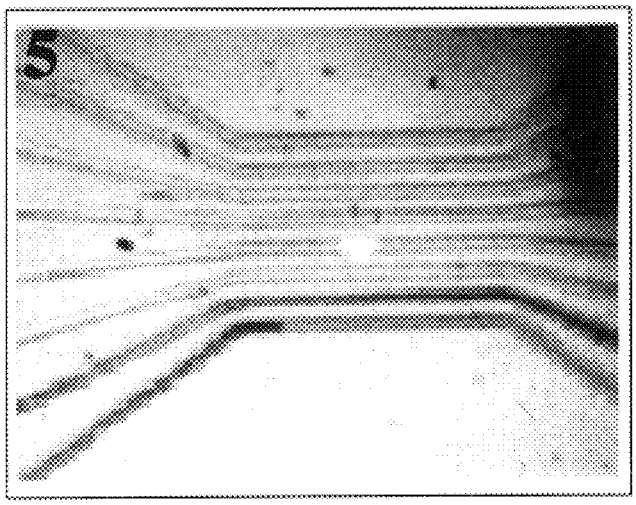
Figure 5F:
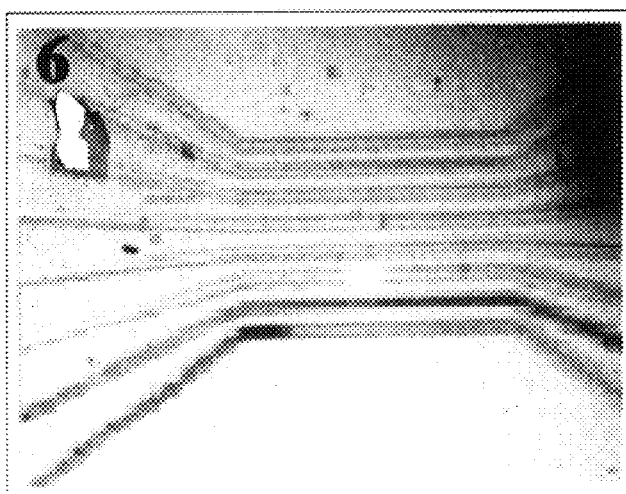

FIGS. 5A–5F show frames from a video recorder as the laser beam scanned across the microchannels 46. Because of the blockage in channels 3 and 5, the fluorescence could not be filled into those channels. When the laser beam scanned across the neighbor channels, there was some reflection from both neighboring channels. In frame 2 (FIG. 5B) as the laser beam excited channel 2, there was some reflection from channel 3, and in frame 3 (FIG. 5C) as the laser beam excited channel 4, there were reflections from channels 3 and 5. Similar reflections can be seen in frame 4 (FIG. 5D). As can be seen, even though the channel-to-channel space is 50 $\mu$m, there is little cross-talk between the adjacent channels, and there is little scattered light.

Figure 6:
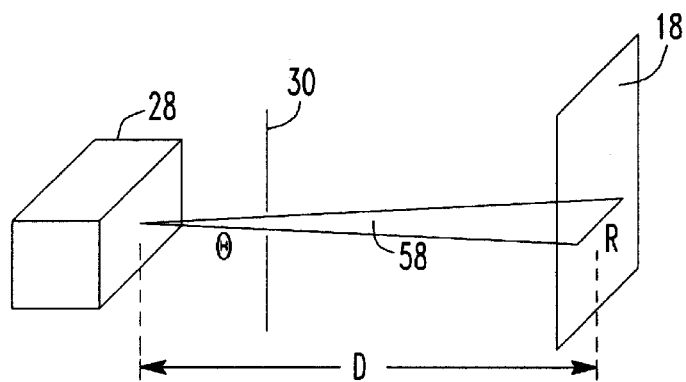
FIG. 6 illustrates the scanning range limitations of the system of FIG. 2.

FIG. 6 illustrates the scanning range limitations of the system of FIG. 2. If the distance from the acousto-optic deflector 28 to the chip 18 is D, and the deflection angle of the first order beam is $\theta$, the scanning range R on the chip 18 can be calculated as below:

$R = D * \tan \theta$

The deflection angle for the acousto-optic deflector 28 IS01205C is 0.28°. The distance between the acousto-optic deflector 28 and the chip 8 is 230 mm. Therefore, the scanning range R for the preliminary configuration of system 10 of FIG. 2 is 1.12 mm, which is the width of detection region 56 in FIG. 4.

The detector 14 of the system 10 of FIG. 2 was implemented with a microscope objective 36 (Melles Griot, Carlsbad, Calif.), a long-pass filter for filter 38, a photomultiplier tube 40 (R3896, Hamamatsu, Bridgewater, N.J.), a socket amplifier (C1053, Hamamatsu, Bridgewater, N.J.) and a low-pass filter 42. (Avens, New York, N.Y.). The objective 36 focuses on the target plane and gathers the fluorescence emissions therefrom. The long-pass filter 38 reduces laser interference and separates the excitation and emission beams. The fluorescence emission signal is received by the PMT 40 and converted to an electrical signal. The output of the PMT 40 is amplified by the socket amplifier and filtered with the low-pass filter 42. The signal is converted from an analog to a digital signal by a 12-bit A/D converter board (DT302, Data Translation) and sampled by computer 20.

The computer 20 (Pentium-II-233, Windows 95) is used to control the driver 32, to sample data from the detector 14, and complete processing, analysis and display of the data. The current software is based on the LabView for Windows program. For the scanning of larger areas and at higher scanning speeds, the software likely will have to be transformed to C-code for direct control.

Considering that one-dimensional scanning using an electronically controllable scanner can randomly address any point within the detection area 56 on the chip 18, the detection is separated into two steps, 1) pre-scanning 2) and detection, to increase temporal resolution.

Figure 7:
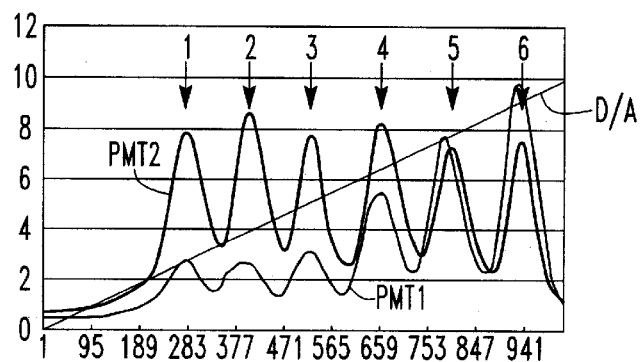
FIG. 7 illustrates a waveform used to control the degree of deflection of the scanner and the signals received from each channel on the target.

In the pre-scanning mode, the channel centers are identified and memorized. The computer 20, through the D/A converter, outputs a sawtooth waveform to the driver 32 to drive the laser beam to scan over all channels 46, and simultaneously collects the signal data from the amplifier/filter 42 through the A/D converter. The program detects the peaks as the laser beam crosses the channels 46, and stores the peak digitized voltages as a function of the value of the sawtooth waveform needed to produce the peak values. From this point forward, the values of the sawtooth waveform which produce the peak values become the output voltages used to control the position of the laser beam on the channels and are referred to as the addressing voltages, i.e. the voltage needed to position the laser beam at a particular point on the target. FIG. 7 shows the output sawtooth waveform and the PMT waveforms for six microchannels, which were filled with the fluorescence dye (YoPro-1, Molecular Probes, Eugene, Oreg.) at a concentration of $10^{-5}$M.

Figure 8:
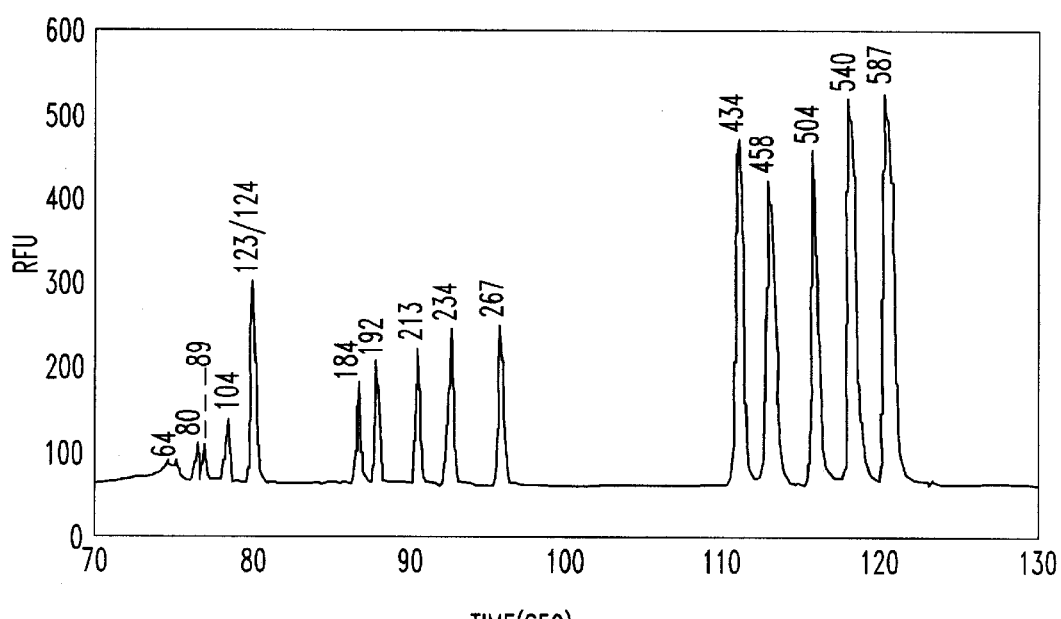
FIG. 8 shows the separation of DNA fragments obtained from the data from one of the channels.

In FIG. 7, it is seen that the peak values for PMT1 were lower at the beginning of scanning. That is the result of loss of power in the laser beam as it passes through the acousto-optic deflector 28 at the maximum diffraction angles. That can be corrected via software compensation, and the result is shown in the figure as PMT2. During the separation and detection, the addressing voltages are outputted sequentially to the acousto-optic deflector 28 driving the laser beam directly to each channel 46. The A/D converter samples the PMT signals as the laser beam stops at each channel 46. The data will be deconvoluted so that electrophoregrams for each channel can be obtained. FIG. 8 shows the separation of DNA fragments in one of the six channels.

Figure 9:
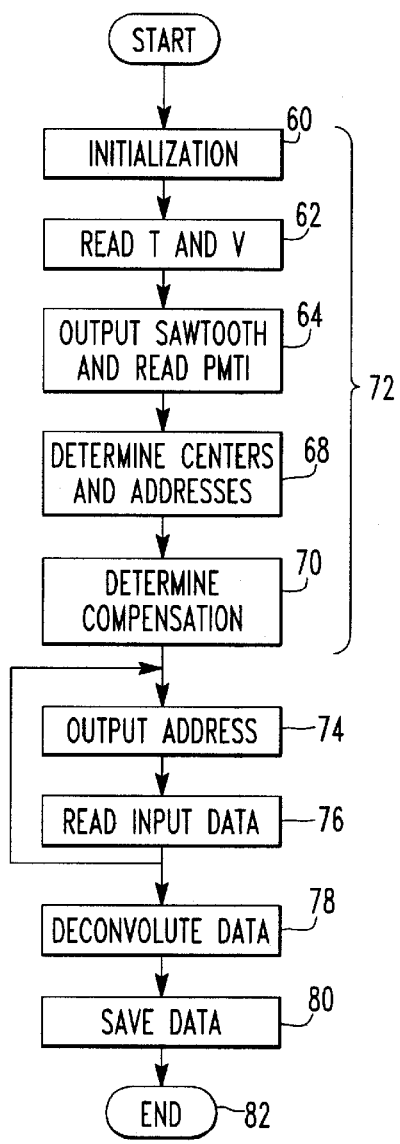
FIG. 9 is a flowchart of the software programming of the computer of FIG. 2.

FIG. 9 illustrates a flowchart of the software programming of the computer 20. The programming starts with an initialization step, step 60, followed by a step where the duration time and voltages for separation are read. The duration time and voltages for separation may be found in memory, or may be input to the device by a user. Thereafter, at step 64, a voltage is output, for example a sawtooth voltage, to the driver 32 and data is read from the detector 14. The read data corresponds to the signal PMT1 shown in FIG. 7. At this point, the capillaries will be filled with a known media such that each capillary should be producing a peak of the same magnitude. From the PMT1 signal, the centers of each capillary are determined and the peak value of the sawtooth waveform (address) needed to produce the peak values determined. At step 70 the amount of compensation required to produce the signal PMT2 shown in FIG. 7 is determined. It should be noted that compensation is carried out so that the peak values are substantially the same, no matter where the lower peak values occur. Generally, lower peak values will occur whenever the light beam loses intensity traveling through the deflector, normally at points of maximum deflection. Steps 60, 62, 64, 66, 68 and 70 may be referred to as a calibration or initialization procedure 72.

One of the benefits of the procedure 72 is that the target 18 need not be precisely positioned within system 10. The calibration procedure may be carried out on all of the channels as previously described. Alternatively, known calibration indicia may be fabricated on the target such that once the known indicia are located, the position of the center of the channels is automatically known. The procedure 72 will be carried out before data is taken, and may be performed again throughout the data gathering process to ensure that the data is being properly gathered.

Once the centers of the capillaries' internal diameters are located and the addresses determined, data gathering can be carried out by outputting the addresses at step 74 and reading the input data from the detector 14 at step 76. Those steps are carried out repeatedly at a predetermined frequency.

At step 78, the data is deconvolved and then is saved per channel at step 80. Depending upon the speed of the processor, the deconvolved step 70 and save step 80 may be carried out in real time. Thereafter, the program ends at step 82.

In comparison with non-scanning detection, such as detection with a CCD camera, the scanning method of the present invention shows several distinct advantages. For example, each channel is individually or sequentially addressed and detected. Intermittent channel illumination results in the absence of scattering from neighboring channels, minimizing cross-talk and increasing the spatial resolution. With mechanical scanning methods, such as stage translation and galvanometric scanning, the separation speed is limited by the speed with which the mechanical device can be moved and/or the mechanical noise the device produces. In contrast, electronic scanning produces very fast, high-resolution positioning within the scanning angle without any moving parts. The temporal resolution achieved by the system 10 is, currently, up to 0.2 ms and, consequently, very fast electrophoretic separations in a multi-channel format can be achieved without compromising data sampling.

Another distinguishing feature of system 10 is the customized scanning rate, which allows considerable flexibility in separation speed while all molecules can be separated with the same accuracy. Applications for this scanning technology are enormous, ranging from existing capillary-based systems to the evolving chip technology, as discussed below. The latter holds the most promise. It is anticipated that the present invention may be applied to any chip technology application that requires accurately-controlled detection at multiple points on the device.

An important parameter determining the scanning range is the selection of the acousto-optic deflector 28 and the distance between the acousto-optic deflector 28 and the chip 18. In the preliminary work just described, the acousto-optic deflector 28 used was relatively inexpensive with limited deflection angle capabilities (0.28°). The acousto-optic deflector 28 was placed 230 mm from the chip, allowing for a 1 mm scanning range to be realized. There are a number of commercial acousto-optic deflectors 28 available, the most notable of which is the GPD-1500-1000 from Brimrose Corpora on (Baltimore, Md.), which has the capability for a 5.7° deflection angle with 1000 spot resolution and 30% efficiency. By calculation, a 20.0 mm scanning range can be realized with this system. Assume a 50 $\mu$m microchannel width and 100 $\mu$m as the center-to-center distance. By the current chip design, 200 channel scanning (scanning range/center-to-center channel distance=20 mm/0.1 mm=200) can be realized with a single acousto-optic deflector 28. The access time for the acousto-optic deflector 28 is 250 ns. Therefore, for a 200 channel chip, the scanning time will be 50 $\mu$s (the scanning rate is 20 kHz); for a 128 channel chip the scanning time is 32 $\mu$s (31.25 kHz), and for a 50 channel chip the scanning time is 12.5 $\mu$s (80 kHz). It is clear how superior these scan speeds are relative to galvanometric scanning and how ultrafast electrophoretic separations could be achieved without concern about inadequate data capture.

Figure 10:
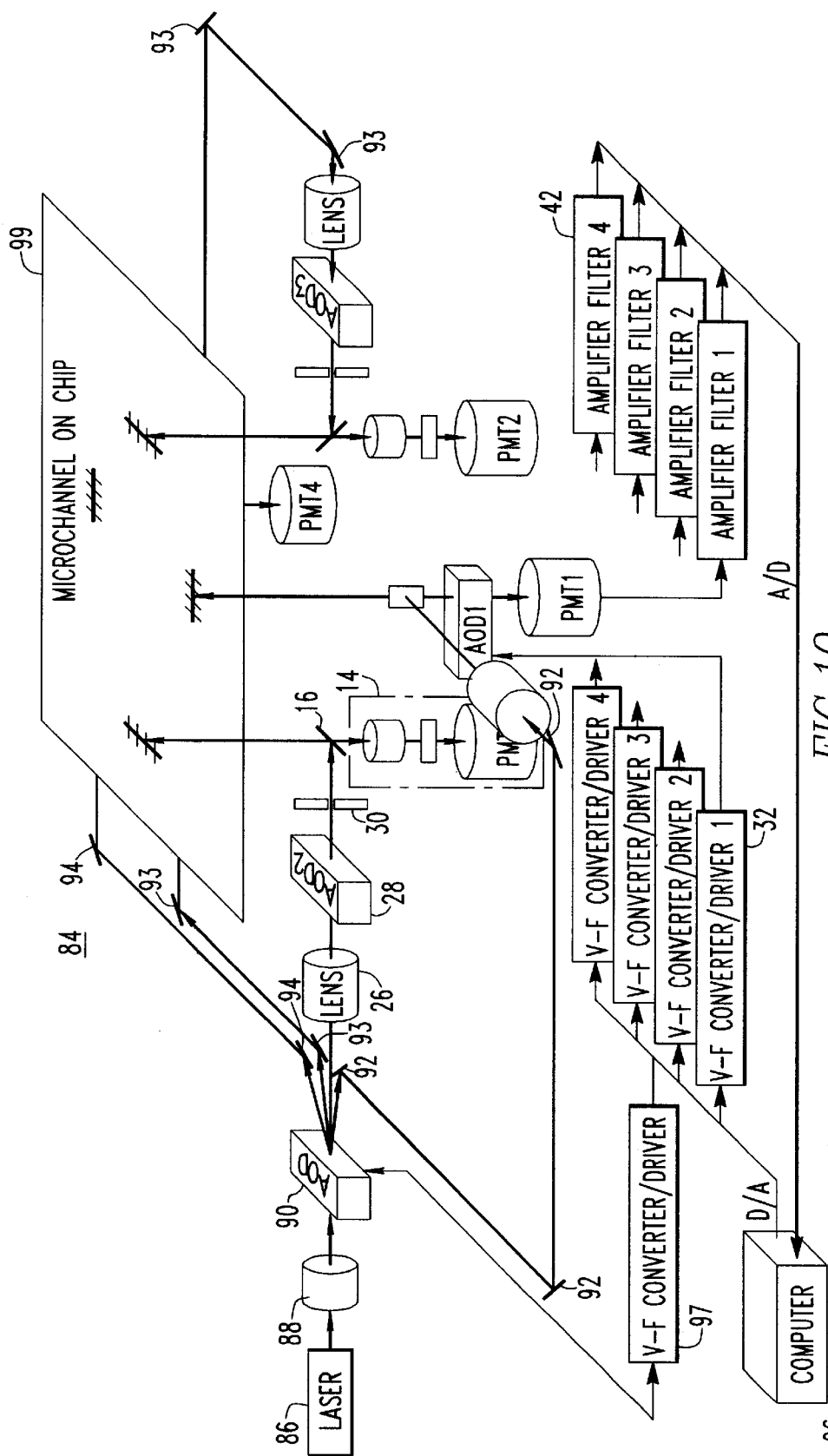
FIG. 10 illustrates a system for use with a target having multiple domains.

Turning now to FIG. 10, a system 84 includes a laser 86 which produces a beam of collimated light input to a beam expander 88. The output of the beam expander 88 is input to an acousto-optic deflector 90 which is under the control of a computer 96 and a V to F converter/driver 97. The acousto-optic deflector 90 deflects the expanded beam of light into a first channel through a series of mirrors 92, directly into a second channel, into a third channel through a series of mirrors 93, or into a fourth channel (not completely shown) through a series of mirrors 94. Each of the channels 1, 2, 3 and 4 is constructed identically and is similar to that shown in FIG. 2. For example, looking at channel 2, channel 2 is comprised of a lens 26, an acousto-optic deflector 28, and a spatial filter 30. The output of channel 2 is directed to a domain on the microchannel chip 99 by a beam splitter 16. The beam splitter 16 also serves to couple output fluorescence from the scanned micro channels to a detector 14. The output of the detector 14 is input to the computer 96 through an amplifier/filter 42 while the acousto-optic deflector 28 for channel 2 is under the control of a V-F converter/driver 32. As a result of the configuration shown in FIG. 10, each of the channels, channels 1, 2, 3 and 4, can produce signals of the type illustrated in FIG. 7. The system 84 of FIG. 10 addresses four different zones on target 99 for scanning and detection. The laser beam can be addressed to one of the four detection zones separately, and moved to another detection zone instantly as the access time for acousto-optic deflector 90 is 13 $\mu$s. Alternatively, some of the domains may not require scanning, but only excitation, as discussed below. In any event, those of ordinary skill in the art will recognize that the number of channels carried by the chip as well as the number and variety of domains may be varied to fit a particular purpose.

Figure 11A:
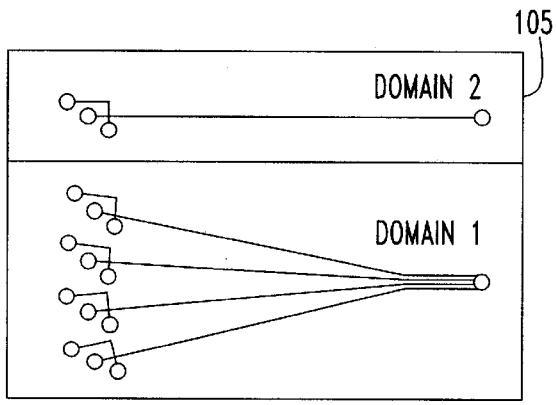
FIGS. 11A and 11B illustrate microchip sample targets.

Random temporal and spatial scanning by the system 84 may also be performed on a target 105 containing domains having different types of excitation or scanning areas as shown in FIG. 11A. For example, domain 1 may be a four channel configuration for a simple size-based separation of several PCR products in parallel. A possible model target application is pancreatic cancer, where there are several sites where loss of heterozygosity is commonly observed. PCR amplification of these domains followed by DNA fragment sizing can be used to detect loss of heterozygosity. Domain 2 may be optimized for a single strand conformation polymorphism (SSCP) assay. An example where point mutations are observed and SSCP analysis can be employed is the k-ras gene in pancreatic cancers. This point mutation is observed in over ninety percent of all pancreatic cancers. SSCP surveys point mutations using PCR amplification of a target sequence with subsequent separation of the products. Genes harboring a mutation will differ from the wild type by an altered base pair. For fluorescence detection in domain 1, the double stranded intercalator will be used as described previously, while the ssDNA fragments evaluated in domain two will have to be covalently-tagged with a fluor having a fluorescein-like spectrum. It is anticipated that many different domain types can be fabricated for specific purposes. In some situations, a single spot or point will need to be excited, e.g., domain 1, while in other situations scanning will need to be performed, e.g., domain 2.

Figure 11B:
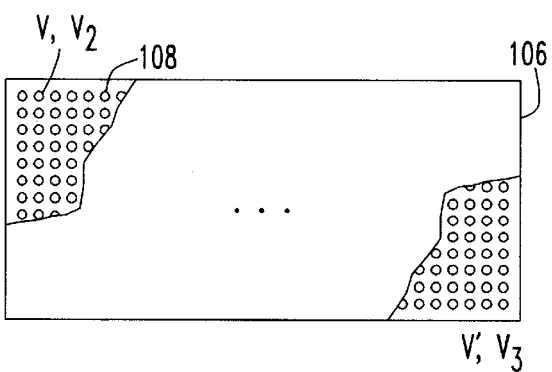

Random temporal and spatial scanning by the system 84 may also be used with a target 106 of the type illustrated in FIG. 11B. The target 106 may be a micro titer plate containing a plurality of wells 108. Titer plates available today have 96 wells formed thereon, whereas the next generation is expected to have 384 wells, and the generation after that over 1,000 wells, on the same platform (i.e. within the same amount of space) as the current micro titer plate carrying 96 wells. Thus, the technology of the present invention is scalable as the chip platforms change. The micro titer plate target 106 may be thought of as an array of points to be excited and fluorescence detected therefrom. Other types of micro-arrays with which the present invention may be used are solid phase-based devices in which chemical entities having fluorescent reporter groups attached thereto are laid out in an array, or other configuration.

One of the advantages of the present invention is that each of the wells 108 on target 106 is addressed by a pair of voltages. For example, a well in the upper left hand comer of FIG. 11B may be addressed by applying a voltage V to AOD 90 and a voltage V2 to AOD2 28. A well 108 in the lower right hand comer of target 106 may be addressed by applying a voltage V' to AOD 90 and a voltage V3 to AOD 3. Each of the voltages V, V2, V', and V3 is representative of a particular frequency. Thus, the voltages V and V' determine the channel, e.g. row within target 106, while the voltages V2 and V3 determine the position within the row. The ability to scan an array by jumping to any point within the array, and dwelling there for as long as necessary, makes the systems 10 and 84 of the present invention extremely flexible.

The ability of the system 84 of FIG. 10 to scan a two-dimensional array opens up additional applications for the present invention, such as retina scanning.

Figure 12:
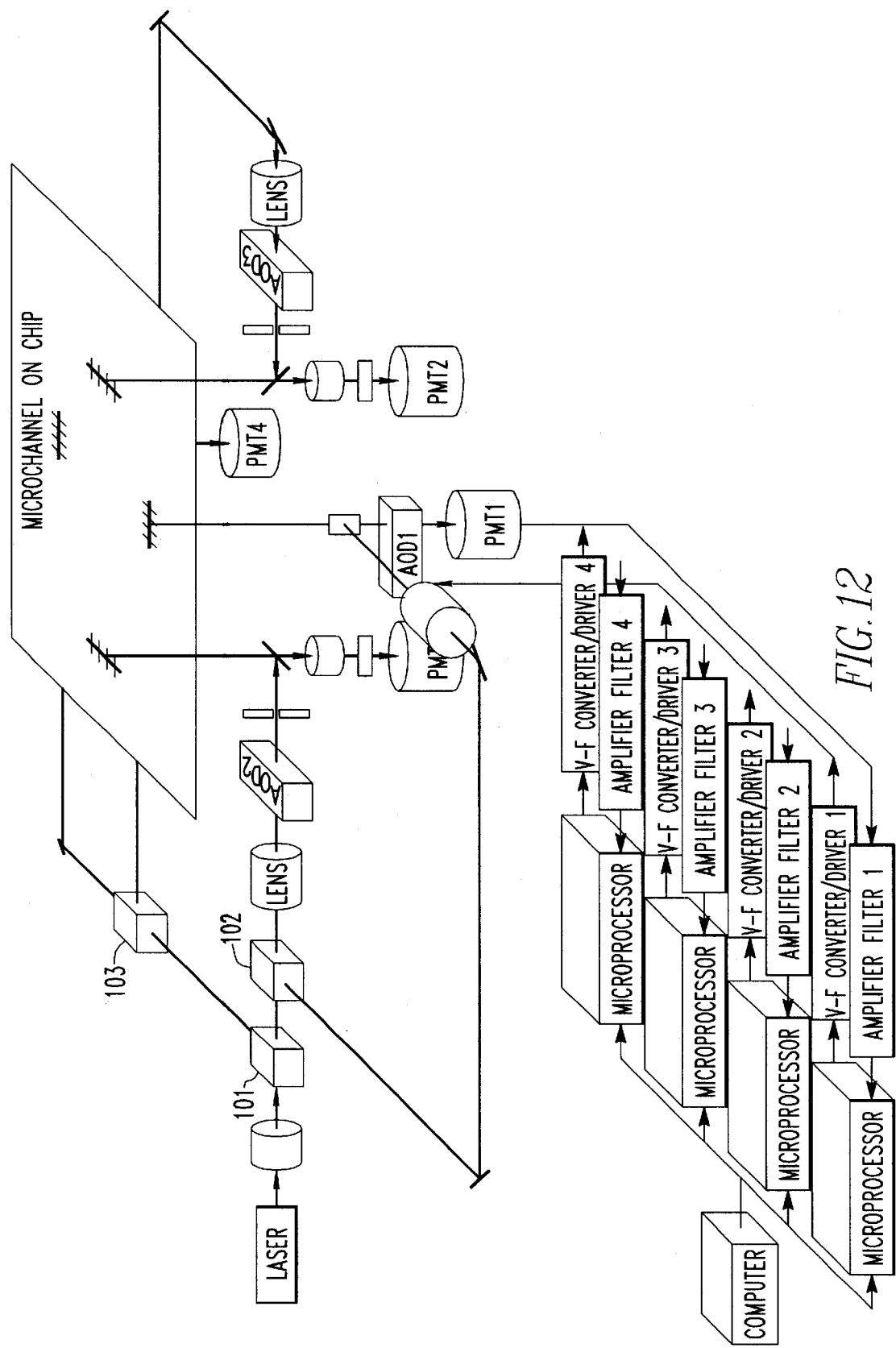
FIG. 12 illustrates an alternative system for use with a target having multiple domains.

In system 84 illustrated in FIG. 10, the access time for the acousto-optic deflectors 28 used in each channel as a scanning actuator is 0.25 $\mu$s, so that the scanning time for 50 channels is about 12.5 $\mu$s. If the four domains or detection zones are detected at the same time and all the zones are 50 channels, the sample interval for a channel is about 50 $\mu$s. That is, the maximum sample frequency is about 20 kHz. For most CE applications this sample rate is enough for separation and analysis. FIG. 12 shows another configuration for higher speed applications.

In the configuration of FIG. 12, three beam splitters 101, 102, 103 are used to split the laser beam into four beams. The four laser beams are directed through precision lenses and the acousto-optic deflectors apply the beams to the chip at the same time. Four microprocessor subsystems control laser beam scanning and addressing, and PMT sampling in the corresponded detection zones. The scanning time is about 12.5 μs for 50 channel detection. That is, the sample rate can be about 80 kHz. The microprocessor subsystem should be designed to realize data communication between the computer and the microprocessors. The computer provides a waveform display, data storage, printer, and other human interface.

Figure 13:
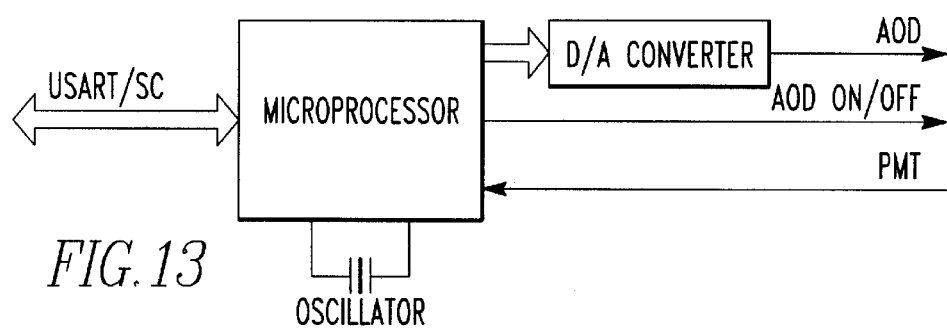
FIG. 13 illustrates a design for a microprocessor subsystem.
Figure 3A:
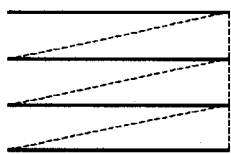
FIGS. 3A–3D illustrate the scanning modes of an acousto-optic deflector.
Figure 3B:
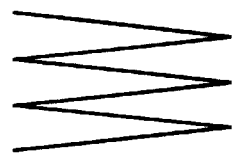
Figure 3C:
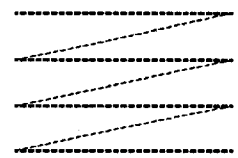
Figure 3D:

FIG. 13 shows the microprocessor subsystem design. A PIC16C773 from Microchip Co. may be used as the microprocessor. It is a high-performance RISC CPU with 20 MHz operating speed, 33 I/O pins, 4 k programmable memory, and 256 data memory. The most important features of this microprocessor are the 12-bit 6-channel analog-to-digital converter (A/D), two PWM modules, and universal synchronous asynchronous receiver and transmitter (USART/SCI). In the design, 12 I/O pins are used for digital-to-analog (D/A) conversion to output address voltages to a driver for an acousto-optic deflector to realize laser beam positioning. One I/O pin is used to control the driver to shut the laser beam on or off. This feature will be useful to shut off the laser beam to alleviate scatter noise to the other detection groups when a detection group is not used. The fluorescence signal from the PMT is sampled by one channel of the A/D converters. The data will be deconvoluted and processed, the electropherogram data of each channel will be obtained and the data will be transmitted to the computer by USART/SCI port. The microprocessor also receives commands from the computer by USART/SCI. The microprocessor subsystems will be built as close as possible to the PMTs, or built with an amplifier and filter to eliminate any interference with the data signals.

The method and scanning apparatus described and claimed has tremendous application to a variety of areas. The ability to scan arrays of microchannels on a microfabricated device with unprecedented speed and without motorized parts leads to tremendous platform flexibility. Moreover, the capability to flexibly address any spot in a two-dimensional array on a chip surface makes it not only applicable to electrophoretic chips, but other chip platforms as well. The application of this technology to other chip platforms where fluorescence detection is required is clear. For example, the method and apparatus may be applied to the oligonucleotide arrays used for matrix hybridization-based detection of DNA, such as those produced by Affymetrix (Santa Clara, Calif.).

With respect to electrophoretic chips, one of the most important aspects of this technology is that it provides an approach for rapid scanning of a larger number of microchannels on a single device without compromising data capture and analysis speed. With the use of multiple acousto-optic deflectors, the rapid and sensitive scanning of microchannel arrays in different domains on a single device with different dwell times associated with each domain can be achieved. The ultrafast scan speeds associated with acousto-optic deflector scanning allow for this to be accomplished. In addition, the scanning associated with each domain need not necessarily be associated with electrophoresis. For example, it is possible to monitor the efficiency of DNA amplification in one domain on the chip as fluorescence increases as a function of double stranded intercalation of fluorescent dyes while electrophoresis occurs in other domains.

In conclusion, the applications of electronically-based scanning devices to chip technology are tremendous. The appropriate development of acousto-optic deflector scanning for one- and two-dimensional applications can expedite the maturation of chip-based technologies. This includes sequencing applications, genotyping and, eventually, the application of chip technology to unravelling the proteome.

While the present invention has been described in connection with preferred embodiments thereof, those of ordinary skill in the art will recognize that many modifications and variations are possible. The foregoing description and the following claims are intended to cover all such modifications and variations.

What is claimed is:

1. An excitation source for use with a plurality of micro-targets, comprising:

a source of light;

a beam expander responsive to said source of light;

a lens responsive to said beam expander, said beam expander and lens selected such that the number of resolvable points given by the equations $$N=D\Delta f/Ys \text{ where}$$

N=number of resolvable points
   Δf=bandwidth of the acoustic frequency
   Ys=acoustic velocity is at least equal to the number of micro-targets;

an acoustic-optic deflector responsive to said lens;

a spatial filter responsive to said acousto-optic deflector; and a driver connected to said acousto-optic deflector.

2. The excitation source of claim 1 wherein said source of light includes a laser.

3. The excitation source of claim 1 wherein said driver includes a voltage to frequency converter.

4. A combination, comprising:

a target having a plurality of micro-areas;

an excitation source for electronically controlling the illumination of each said micro-areas; and a device for optically coupling said excitation source to said target.

5. The combination of claim 4 wherein said excitation source includes a laser and an acousto-optic deflector.

6. The combination of claim 4 wherein said excitation source includes a laser and an electrooptic deflector.

7. The combination of claim 4 wherein said excitation source includes a laser and a piezoelectric deflector.

8. The combination of claim 4 wherein said target includes an electrophoresis chip having a plurality of microchannels.

9. The combination of claim 4 wherein said target includes an electrophoresis chip having a plurality of domains, each domain having at least one micro-area.

10. The cominbation of claim 4 wherein said target includes a microtiter plate having a plurality of wells.

11. A system, comprising:

an excitation source for electrically controlling the excitation of a plurality of micro-areas on a target:

a detector; and means for optically connecting said excitation source to the target and for optically connecting the target to the detector.

12. The system of claim 11 wherein said excitation source includes a source of collimated light, a beam expander, a lens, an acousto-optic deflector, and a filter all optically aligned with said source of collimated light, and a driver connected to said acousto-optic deflector.

13. The system of claim 11 additionally comprising a computer responsive to said detector, said computer producing a signal input to said driver.

14. The system of claim 11 wherein said detector includes an objective lens, a long pass filter, and a photomutiplier tube.

15. The system of claim 11 wherein said excitation source includes a laser and an acousto-optic deflector.

16. The system of claim 11 wherein said excitation source includes a laser and an electrooptic deflector.

17. The system of claim 11 wherein said excitation source includes a laser and an piezoelectric deflector.

18. The system of claim 11 wherein said target includes an electrophoresis chip having a plurality of microchannels.

19. The system claim 11 wherein said target includes an electrophoresis chip having a plurality of domains, each domain having at least one micro-area.

20. The system of claim 11 wherein said target includes a micro titer plate having a plurality of wells.

21. A system, comprising:
a source of light;
a plurality of channels, each for receiving light from said source and each including a deflector for electrically controlling the illumination of a plurality of micro-targets in a target plane;
a detector; and
means for optically coupling said plurality of channels and said detector to the target plane.

22. The system of claim 21 wherein said source of light includes a laser.

23. The system of claim 21 wherein each of said deflectors includes an acousto-optic deflector.

24. The system of claim 21 wherein each of said deflectors includes an electrooptic deflector.

25. The system of claim 21 wherein each of said deflectors includes a piezoelectric deflector.

26. The system of claim 21 wherein said means for optically coupling includes a plurality of dichroic beam splitters.

27. The system of claim 21 additionally comprising a beam splitter for enabling each of said plurality of channels to simultaneously receive said light.

28. The system of claim 21 additionally comprising a plurality of mirrors for enabling each of said plurality of channels to sequentially receive said light.

29. A system, comprising:
an excitation source providing a source of light;
a plurality of channels, each for receiving light from said excitation source and each including a deflector for electrically controlling the illumination of a plurality of micro-targets in a target plane, said excitation source electronically controlling which of said plurality of channels receives said light;
a detector; and
means for optically coupling said plurality of channels and said detector to the target plane.

30. The system of claim 29 wherein each of said deflectors includes an acousto-optic deflector.

31. The system of claim 29 wherein each of said deflectors includes an electrooptic deflector.

32. The system of claim 29 wherein each of said deflectors includes a piezoelectric deflector.

33. The system of claim 29 wherein said means for optically coupling includes a plurality of dichroic beam splitters.

34. The system of claim 29 wherein said excitation source includes one of an acousto-optic deflector, electrooptic deflector and a piezoelectric deflector.

35. A method, comprising:
expanding a beam of light;
focusing said beam of light to a desired diameter such that the number of resolvable points given by the equation $$N = D \Delta f / Y_s$$

where
N = number of resolvable points
$\Delta f$ = bandwidth of the acoustic frequency
$Y_s$ = acoustic velocity is at least equal to a number of micro-targets to be illuminated;
deflecting said focused beam with an acousto-optic deflector; and
filtering the light output from said acousto-optic deflector to reduce certain orders of diffraction.

36. The method of claim 35 additionally comprising the steps of generating a voltage, converting said voltage to a frequency, and using the frequency to determine the degree of deflection provided by said acousto-optic deflector.

37. A method, comprising:
exciting a plurality of micro-areas of a target with a beam of light;
electronically controlling the position of said beam of light beam on said target; and
detecting fluorescence emitted from said micro-areas as a result of said exciting step.

38. The method of claim 37 wherein said electronically controlling step includes applying voltages to a deflector, said method additionally comprising:
determining which voltage produces peak fluorescence for at least one of said micro-areas; and
storing said voltage as an address for said micro-area.

39. The method of claim 38 additionally comprising a compensation step wherein for each micro-area for which a peak value is determined determining voltage values needed for each address to make all the peak fluorescence values equal.

40. The method of claim 37 additionally comprising the step of controlling the length of time that the beam of light stays at a particular position.

41. A method, comprising:
electronically controlling the amount of deflection provided by a deflector so as to provide illumination to a selected one of a plurality of micro-areas of a target.

42. The method of claim 41 wherein said micro-areas include one or more of domains, channels and wells.

43. The method of claim 41 wherein said electronically controlling step includes the step of controlling the length of time that the micro-areas are illuminated.

44. The method of claim 41 wherein said electronically controlling step includes the step of electronically controlling the amount of deflection provided by an acousto-optic deflector.

45. The method of claim 41 wherein said electronically controlling step includes the step of electronically controlling the amount of deflection provided by an electrooptic deflector.

46. The method of claim 41 wherein said electronically controlling step includes the step of electronically controlling the amount of deflection provided by a piezoelectric deflector.

47. The method of claim 43 wherein said step of electronically controlling includes the steps of providing illumination to at least one of a plurality of micro-areas of a target by varying a voltage applied to a deflector, said method additionally comprising:

measuring fluorescence from said at least one micro-area in response to each of the applied voltages;

determining which of the applied voltages produces a peak value of fluorescence for said at least one of said micro-areas; and storing that voltage as an address for that micro-area.

48. The method of claim 43 wherein said step of electronically controlling includes the steps of providing illumination to at least one of a plurality of micro-areas of a target by varying a first voltage applied to a first deflector and a second voltage applied to a second deflector, said method additionally comprising:

measuring fluorescence from said at least one micro-area in response to each of the applied voltages;

determining which of the first and second applied voltages produce a peak value of fluorescence for said at least one of said micro-areas; and storing those voltages as an address for that micro-area.

49. The method of claim 41 wherein said electronically controlling step includes the step of serially illuminating said plurality of micro-areas.

50. The method of claim 41 wherein said electronically controlling ep includes the step of illuminating certain of said plurality of micro-areas in parallel.

51. The method of claim 41 wherein said electronically controlling step includes the step of illuminating certain of said plurality of micro-areas according to a fixed pattern.

52. The method of claim 41 wherein said electronically controlling step includes the step of randomly illuminating certain of said plurality of micro-areas.

53. The method of claim 47 wherein said electronically controlling step includes the steps of electronically controlling the scanning of a plurality of micro-areas located in a first domain and electronically controlling the scanning of a plurality of micro-areas located in a second domain.

54. The method of claim 41 wherein said electronically controlling step includes the step of electronically controlling the illumination of a point micro-area target in a first domain and electronically scanning a plurality of micro-areas in a second domain.

* * * * *